R. G. MAY.
AUTOMOBILE DIRECTION INDICATOR.
APPLICATION FILED NOV. 19, 1920.
1,409,881.
Patented Mar. 14, 1922.
2 SHEETS—SHEET 1.
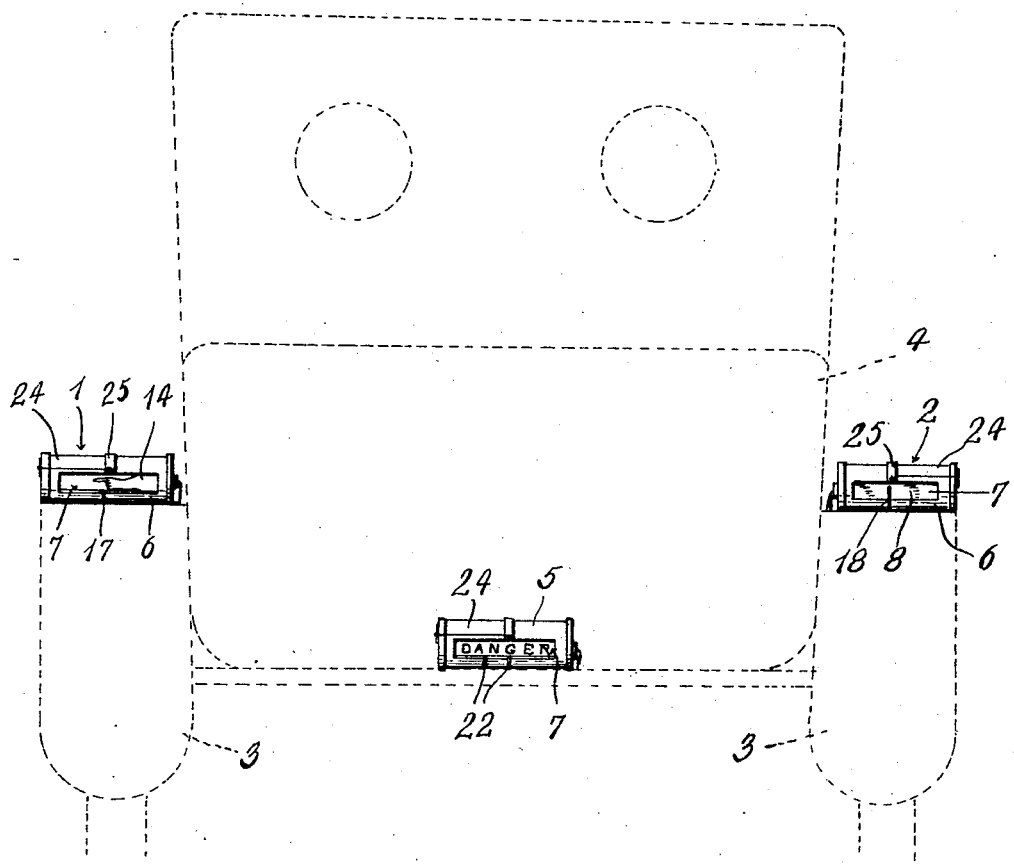
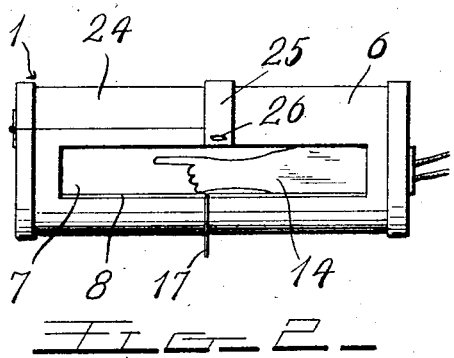
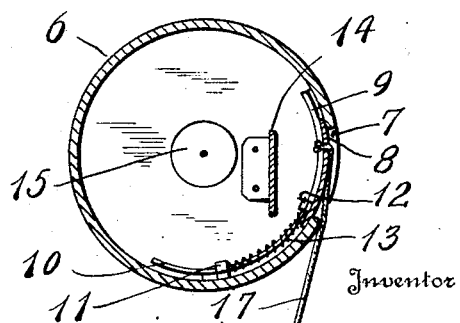
Inventor
Robert G. May R. G. MAY.
AUTOMOBILE DIRECTION INDICATOR.
APPLICATION FILED NOV. 19, 1920.
1,409,881.
Patented Mar. 14, 1922.
2 SHEETS—SHEET 2.
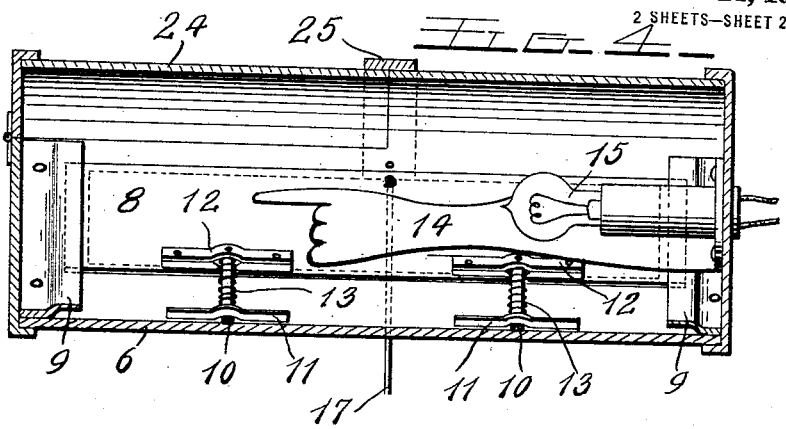
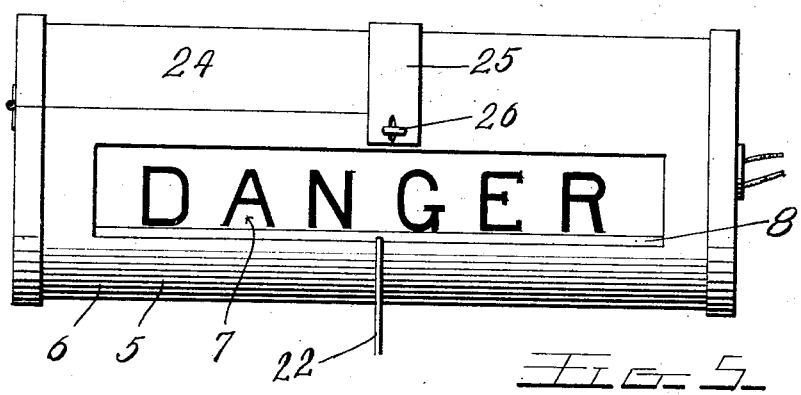
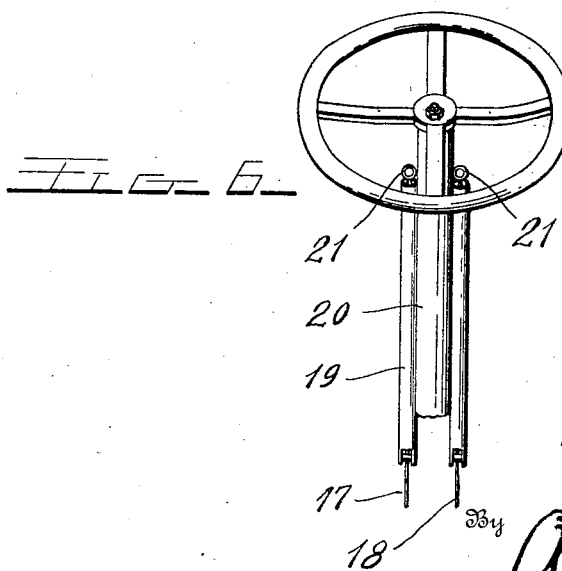
Inventor
Robert G. May
Attorney

UNITED STATES PATENT OFFICE.

ROBERT G. MAY, OF LOUISVILLE, KENTUCKY.

AUTOMOBILE DIRECTION INDICATOR.

1,409,881. Specification of Letters Patent. Patented Mar. 14, 1922.

Application filed November 19, 1920. Serial No. 425,203.

*To all whom it may concern:*

Be it known that I, ROBERT G. MAY, a citizen of the United States, residing at Louisville, in the county of Jefferson and State of Kentucky, have invented certain new and useful Improvements in Automobile Direction Indicators; and I do hereby declare the following to be a full, clear, and exact description of the invention, such as will enable others skilled in the art to which it appertains to make and use the same.

This invention relates to new and useful improvements in direction indicators for automobiles and has for its primary object the provision of side signals adapted to operate in conjunction with a warning or danger signal that is adapted to attract attention to the side signals so that following traffic may in sufficient time notice which side signal is in operation and thereby determine the direction in which the turn is to be made by the preceding automobile, so as to avoid collisions or accidents.

Another object of this invention is the provision of an automobile direction indicator of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a view of an automobile in dotted lines showing the direction signals applied thereto, Figure 2 is an enlarged elevational view of one of the signals, Figure 3 is a transverse sectional view illustrating the same, Figure 4 is a longitudinal sectional view illustrating the same, Figure 5 is a detail view illustrating a warning signal, Figure 6 is a detail view illustrating the control.

Referring in detail to the drawings, the numerals 1 and 2 indicate side signals secured to the rear fenders 3 of the automobile 4 and the numeral 5 indicates a warning or danger signal located at the rear of the automobile 4 and is adapted to operate in conjunction with either of the side signals 1 and 2 for the purpose of attracting attention to the side signals. The signals each include a substantially cylindrical casing 6 having an elongated sight opening 7 formed therein and which is normally closed by a sliding door 8. The door 8 is curved to conform to the contour of the casing 6 and is slidably mounted in guides 9 and has secured thereto rods 10 slidably mounted in brackets 11 carried by the casing 6 upon the interior thereof. The rods 10 have formed thereon heads 12 which are secured in any desired manner to the door 8. Springs 13 are mounted on the rods 10 between the brackets 11 and the heads 12 for the purpose of normally urging the door 8 into a closed position. A transparent signal 14 of any desired shape preferably in the form of a hand is secured to one end wall of the casing 6 and lies directly behind the opening 7 and normally concealed from view by the door 8. An electrical lamp socket 15 is carried by the last named end wall of the casing 6 and is located in rear of the transparent panel 14 and is adapted to illuminate or accentuate the panel so that the same can be readily noticeable when the door 8 is moved into an opened position. Cables 17 and 18 are connected to the doors 8 of the side signals 1 and 2 and extend through tubes 19 secured to the steering post 20 of the automobile 4 and have connected to their free ends finger grips 21 so that the operator may readily open the doors to either of the casings by pulling on the proper finger grip 21. As soon as the pull is released on the doors, the doors are returned to their closed position by means of the springs 13.

The danger or warning signal 5 is identical in construction with the side signals 1 and 2 except the transparent panel therein carries the word "Danger" coated or otherwise applied thereto. The door of the warning or danger signal has connected thereto cables 22, one of which is connected to the cable 18 while the other one is connected to the cable 17 so that upon actuating either one of the side signals, the warning or danger signal will be actuated therewith.

Each of the casings 6 are provided with one-half of their rear portions open and closed by a hinged wall or cover 24. The cover or wall 24 is provided with an attaching strip 25 adapted to be detachably secured to the casing 6 by suitable fasteners 26 thereby providing a construction wherein the casing 6 can be opened when desiring to adjust or replace any of the parts contained within the casing.

While I have shown and described the preferred embodiment of my invention, it will be understood that minor changes in construction, combination and arrangement of parts may be made without departing from the spirit and scope of the invention as claimed.

Having thus described my invention what I claim is:

1. A signaling device having a casing provided with an opening, an indicator extending rigidly from an end wall of said casing to be viewed through said opening, a shutter movable over said indicator and a lamp extending from said end wall in the rear of said indicator.

2. A signaling device having a casing provided with an opening, an indicator extending from an end wall of the casing within the same to be viewed through said opening, a closure for said opening, guides within the casing for the ends of said closure, a rod extending from the closure, means in which the rod is slidably mounted, a spring on the rod intermediate said means and the closure to urge the closure to a closed position, a lamp extending from the same said wall as the indicator in the rear of the indicator, and means to move the shutter counter to said springs extending through the opening.

In testimony whereof I affix my signature in presence of two witnesses.

ROBERT G. MAY.

Witnesses:
Dr. J. O. Catalan,
Dr. J. W. Johnson.